Feb. 21, 1928. 1,659,981
P. McLOUGHLIN
CROSS CHAIN REPAIR LINK
Filed Sept. 20. 1926

Inventor
Patrick McLoughlin
By Attorneys
Southgate Fay & Hanley

Patented Feb. 21, 1928.

1,659,981

UNITED STATES PATENT OFFICE.

PATRICK McLOUGHLIN, OF WORCESTER, MASSACHUSETTS.

CROSS-CHAIN REPAIR LINK.

Application filed September 20, 1926. Serial No. 136,439.

This invention relates to a repair link for anti-skid chains.

The principal object of the invention is to provide a repair link of inexpensive and simple character which can be placed on a cross chain in open position and will be pressed into locking condition by the running of the wheel over it.

The invention also involves the making of this repair link out of sheet stock in a very inexpensive manner and thus presenting flat surfaces to the tire and the locking of the link in such a way that the end of the link, which is bent inwardly in closing, cannot pass through the loop of the link and thus possibly abrade the tire as it is run continuously in practice. The invention also involves details of construction of the link.

Reference is to be had to the accompanying drawings in which

Figure 1:
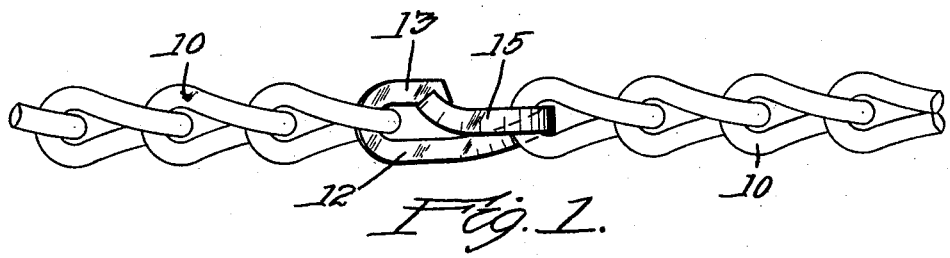
Fig. 1 is a plan view of a cross chain showing a repair link of preferred construction applied thereto.
Figure 2:
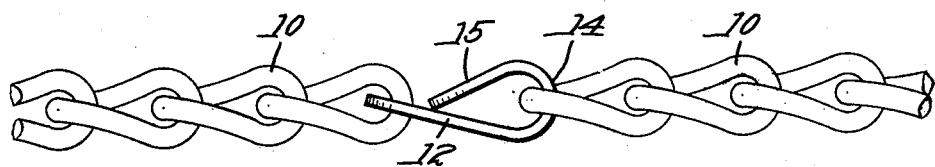
Fig. 2 is a side view of the same.
Figure 4:
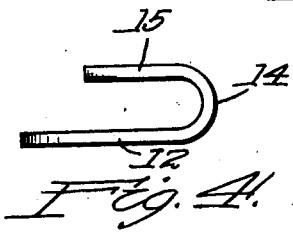
Fig. 4 is a side view of the repair link by itself in open position.

In the form of the link shown in the first four figures, it is, of course, intended to be used with a cross chain 10, mounted on a tire 11 in the usual way. When the cross chain is broken, a repair link 12 constructed in accordance with this invention is employed.

This link has a hook 13 at one end, the extremity of the hook being formed in a line parallel with the main body of the link throughout the length of the hook. This furnishes a space into which the next link of the chain 10 can be inserted conveniently.

The main body of the link extends along straight opposite the hook 13 and these parts are located in a plane. The whole device is formed of sheet steel or other stock cut out into shape and of a single piece of metal. The end of the body portion is bent upwardly at 14 and back to form a tongue 15 in a plane spaced from, and parallel with, the plane of the body of the link and the hook end 13. In this form of the invention the end of this tongue 15 is cut out originally in a slanting position so that the end of it projects to a point above the hook end 13. The purpose of this will appear later but it will be seen that the tongue 15 extends across the link from one side to the other in a slanting direction.

In the use of the link, one link of the chain 10 is introduced into the hook end 13 as shown in Fig. 1 and the opposite link of the chain 10 is strung under the tongue 15 as also shown. As the repair link is formed of sheet steel preferably and is not easily bent by ordinary tools which automobile users have at hand it will remain in that condition.

Figure 3:
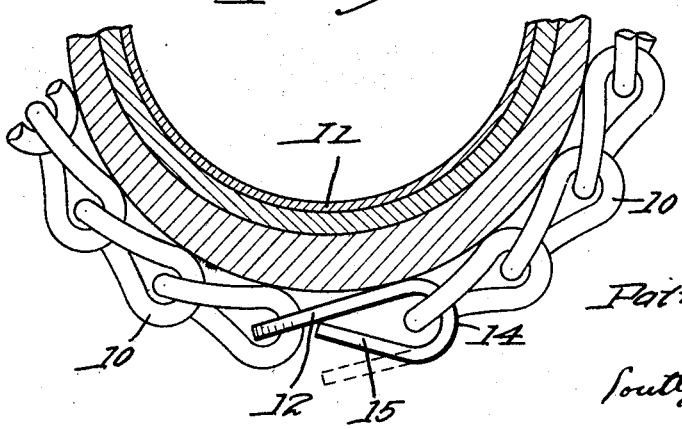
Fig. 3 is a side view of the chain applied to the wheel illustrating the way in which the link is closed.

It will be noticed that the tongue 15 is out at the dotted line position in Fig. 3. Now when the wheel is rolled around once on the ground, the pressure from the weight of the car on the link will force it back from the dotted line to the full line position in Fig. 3.

It will be obvious that the end of the tongue 15 will come into contact with the hook end 13 and form in that way a positive closure of the repair link. This prevents the chain link on that end from becoming detached from the repair link. The chain link on the other end, as stated, is located back of the tongue 15 and the bending down of the end of the tongue into contact with the hook end 13 also provides a positive means for preventing disengagement at this end, although the tongue 15 does not come into contact with the body portion of the link 12 except at the end of the hook 13.

It is an important feature that the end of the tongue 15 engages, or comes into close proximity with, the hook 13, as that positively closes the link against the detachment of both of the chain links to which it is connected. Furthermore the end of the tongue 15 which is cut off rather square to save expense cannot get down into the space between the hook end 13 and the body of the link 12 and thus possibly project through into contact with the tire. On the contrary, the surface of the repair link which engages the tire is perfectly flat and it engages it in two areas at opposite sides of the repair link, one of them being obviously the back of the hook end 13. Thus this repair link subjects the tire to less wear than the ordinary links of the chain.

This constitutes a very simple device for this purpose. It does not require any manual operation to close it. It is so constructed that the links 12 will set in position while the wheel is being rolled along the ground. This is due largely to the fact that the tongue 15 extends across the link as stated above, and as will be obvious, it contains no ends that can stick into the surface of the tire and cause a weakening of the fabric or rubber. It is very inexpensive to make and there is no difficulty whatever about putting it in place.

Figure 5:
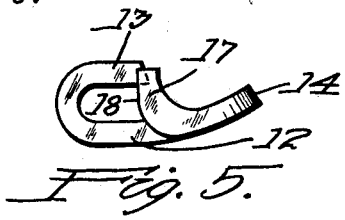
Fig. 5 is a plan of a modified form of repair link embodying most of the features shown in the first four figures.

In the form shown in Fig. 5, the repair link is made of the same material and the hook end 13 of the link 12 is the same as above described. In this case the end 17, which locks the chain sections in position, instead of extending across the link diagonally, bends suddenly in a transverse direction and extends transversely at that point for the same purposes as in the first four figures. Here it presents a surface 18 which is exactly transverse to the length of the chain. This surface more positively prevents the disengagement of the chain link on the right hand side and furnishes a flat wall against which no pressure can be transmitted to bend the link out of shape to such an extent as to allow the release of the chain links.

Figure 6:
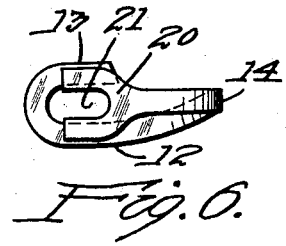
Fig. 6 is a similar view of another form of this invention.

In the form shown in Fig. 6 I provide a further lock of this nature in the form of an end 20 having a slot 21 for receiving the left hand link and holding it at both sides against displacement. All these links are made of flat or sheet stock, cut out rapidly by dies and bent into shape with equal rapidity by machine methods. Therefore they are very inexpensive to manufacture, require no finishing and come out of the cutting and bending dies exactly the same shape.

Although I have illustrated and described only three forms of the invention, I am aware of the fact that other modifications can be made therein by any person skilled in the art without departing from the scope of the invention as expressed in the claims.

Therefore I do not wish to be limited in these respects, but what I do claim is:

1. As an article of manufacture, a repair link for the cross chains of vehicle tires consisting of a piece of flat sheet metal cut out in a form in which the bottom of the link is provided with a hook end parallel with the body and spaced therefrom for receiving a link of a cross chain at one end, the other end of the link comprising a tongue bent up into a plane parallel with the plane of the body of the link and extending across the link to overlap the hook end and the space between the hook end and said body, both in open and closed position, whereby two chain links can be attached to the repair link on a tire and the repair link will be closed to lock them both against displacement in separate non-communicating loops by the rolling of the wheel along the ground.

2. As an article of manufacture, a repair link for the purpose described, having a straight body portion, a hook end at one end parallel therewith, the body portion and hook end constituting the bottom of the link in a horizontal plane and a locking tongue bent down from above at the other end into contact with the top of the hook end and limited thereby so as to prevent its passing through the link and engaging the tire.

3. As an article of manufacture, a repair link having a body portion and a hook end at one end in one horizontal plane and having a tongue at the other end normally spaced materially above the plane of the hook and bent, when closed down, into engagement with the hook end and body portion and extending across the link transversely from the body portion to the hook end so as to close automatically by the weight of the car when the car runs over it and form two separate loops.

4. As an article of manufacture, a repair link comprising a piece of sheet metal having a body portion and a parallel hook end and a tongue at the other end bent into engagement with the hook end and having two ends bent down substantially into contact with the hook end and the body of the link respectively and providing a recess between them for the reception of the chain link.

In testimony whereof I have hereunto affixed my signature.

PATRICK McLOUGHLIN